(12) United States Patent
Hayakawa

(10) Patent No.: US 8,426,991 B2
(45) Date of Patent: Apr. 23, 2013

(54) POWER GENERATOR CONVERTING FLUID ENERGY INTO ELECTRICAL ENERGY AND POWER GENERATION SYSTEM OF THE SAME

(75) Inventor: Yukihiko Hayakawa, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 510 days.

(21) Appl. No.: 12/659,205

(22) Filed: Mar. 1, 2010

(65) Prior Publication Data

US 2010/0225112 A1  Sep. 9, 2010

(30) Foreign Application Priority Data

Mar. 6, 2009 (JP) ................................ 2009-052745
Mar. 6, 2009 (JP) ................................ 2009-052746
Mar. 6, 2009 (JP) ................................ 2009-052908

(51) Int. Cl.
*H02P 9/04* (2006.01)
(52) U.S. Cl.
USPC .................... 290/43; 310/156.36; 310/268
(58) Field of Classification Search ............. 290/43, 290/54; 322/93; 310/156.35
See application file for complete search history.

(56) References Cited

U.S. PATENT DOCUMENTS

| 4,875,110 A * | 10/1989 | Kazama et al. ................. 360/64 |
| 7,960,884 B2 * | 6/2011 | Miyata et al. ............ 310/156.12 |
| 8,183,814 B2 * | 5/2012 | Fuchs ........................... 318/524 |

FOREIGN PATENT DOCUMENTS

| JP | 2002-320364 | 10/2002 |
| JP | 2008-086128 | 4/2008 |

* cited by examiner

*Primary Examiner* — Michael Zarroli
(74) *Attorney, Agent, or Firm* — Manabu Kanesaka

(57) ABSTRACT

A power generator has a magnet rotor rotating upon receiving rotating force from a driving source and a stator coil arranged to face magnetic poles of the magnet rotor. The magnet rotor includes a rotary shaft supported by a housing and a permanent magnet. The stator coil includes coreless winding wires arranged to face the magnetic poles and a three-phase output terminal. The coreless winding wires are formed of effective output winding wires and connected with the three-phase output terminal through a switching device. The switching device is connected to a controlling device. The magnet rotor has a discoid shape including the rotary shaft at the center. The coreless winding wires form a pair of coil bodies arranged to sandwich the magnetic poles. The switching device changes the inductance value to a small value or a large value by connecting the winding wires to the three-phase output terminal.

7 Claims, 8 Drawing Sheets

POWER GENERATOR CONVERTING FLUID ENERGY INTO ELECTRICAL ENERGY AND POWER GENERATION SYSTEM OF THE SAME

RELATED APPLICATIONS

The present application is Japanese Patent Application No. 2009-052745 filed Mar. 6, 2009; No. 2009-052746 filed Mar. 6, 2009; and No. 2009-052908, the disclosure of which is hereby incorporated by reference herein in its entirety.

BACKGROUND OF THE INVENTION

The present invention relates to a power generator that converts fluid energy such as wind power, water power, or heat into electrical energy and a power generation system including this power generator, and relates to an improvement in a power generation mechanism.

In general, this type of power generation apparatus is widely known as an apparatus that converts energy such as wind power, water power, or heat into electrical energy. Further, a mechanism that uses external energy to rotate a spinning rotor having the same power generation principle as that of a power generator and outputs an electric current produced in a coil by the rotating force is also widely known.

As a conventionally known power generator, for example, Patent Document 1 (Japanese Patent Application Laid-open No. 2008-086128) discloses a configuration that a magnet rotor having a plurality of magnetic poles arranged in a rotating direction is rotatably disposed to a housing, a coil frame is arranged on a housing inner wall to surround the rotor, and a winding wire is wound around this coil frame to configure a power generation unit. Furthermore, when the number of the winding wires is three or its multiple number, a three-phase alternating current can be obtained.

In a field type synchronous generator disclosed in Patent Document 1, since electromotive force is generated in a coil wound around a core, large magnetic field attracting force functions at the time of slow rotation or activation, and a large resistance (a cogging torque) acts. Therefore, effective power generation cannot be performed at a low wind velocity. Furthermore, it is also known that heat generated when producing electromotive force in a coil must be efficiently liberated.

Thus, for example, Patent Document 2 (Japanese Patent Application Laid-open No. 2002-320364) suggests a method for using a coreless coil to reduce the cogging torque. This publication suggests a power generation mechanism having a configuration that a magnet rotor has a plurality of magnetic poles arranged on a concentric circle with a rotary shaft at the center and a plurality of winding wires are arranged in parallel to the magnetic poles to form a coil layer.

When the magnet rotor is driven and rotated to produce electromotive force in a stator coil as described above, a change in energy such as wind power or water power becomes a problem. For example, in case of a wind generator system, an electric current having a predetermined voltage must be obtained even in a light wind state, and stable electric power must be obtained even in a high wind state. In conventional examples, when rotating one of a coil and a magnet forming a magnetic pole by using external energy to generate electromotive force in the coil, electromotive force characteristics of the coil and field characteristics of the magnet are set constant. Therefore, each of a lower limit value when the external energy that makes the power generation system to be operable is weak and an upper limit value when the same is strong is set to fall within a fixed range.

That is, it is known that in the synchronous generator, the cogging torque acts on a driving rotary shaft that rotates at a lower speed when rotating force of wind power or the like is small, so that stable electric power cannot be obtained. Further, likewise, when the rotating force of the wind power or the like is excessive, the rotary shaft rotates at an excessively high speed, and a frequency of electric power generated in the coil increases. When the electric power to be output is connected with an electric power system, reducing a rotating speed of an input source to be lower than a synchronous speed results in a decrease in frequency, and increasing the rotating speed to be higher than the synchronous speed results in a rise in frequency, thereby leading to a problem that the stable electric power cannot be obtained. Since this type of power generation system is installed in a place where an input in a predetermined range (predetermined strength) can be obtained, using the system for extensive purposes, especially installing the system as a small facility is difficult.

Thus, the present inventor has conceived an idea that a power generation enabling range can be extensively set by changing an inductance of a coil to a large or small value in accordance with an intensity of external energy.

It is a main object of the present invention to provide a power generator that can generate power having a predetermined voltage and a predetermined current even though external energy is slight or excessively strong when generating power by using water power or wind power. Furthermore, it is another object of the present invention to provide a system that can obtain power having a predetermined voltage and a predetermine current even through a wind-power generation system is in a slight or excessively strong wind state.

BRIEF SUMMARY OF THE INVENTION

To achieve the objects, the present invention is characterized in that winding wires of a coil is formed of effective output winding wires whose number is three or its multiple number and they are connected with an output terminal through switching means so as to enable switching a total number of turns to a large or small value when producing electromotive force in a stator coil based on rotation of a magnet rotor. As a result, a large inductance is set when external energy such as wind power is excessively small (slight wind), a small inductance is set when the external energy is excessively strong (high wind), thereby outputting power having a stable voltage and a stable current even though an intensity of the external energy, e.g., wind power changes.

To explain a configuration that achieves the objects in detail, there is provided a power generator comprising: a magnet rotor that rotates upon receiving rotating force from a driving source; and a stator coil arranged to face magnetic poles of this magnet rotor, wherein the magnet rotor includes a rotary shaft rotatably and axially supported by a housing; and a permanent magnet that forms a plurality of magnetic poles on a concentric circle with the rotary shaft at the center. Moreover, the stator coil includes: a plurality of coreless winding wires arranged to face the magnetic poles formed in the magnet rotor; and a three-phase output terminal that outputs power generated in the plurality of winding wires to the outside. Thus, the plurality of coreless winding wires are formed of effective output winding wires whose number is three or its multiple number, and they are connected with the three-phase output terminal through switching means so as to enable switching a total number of turns to a large or small value. This switching means is connected with controlling means in such a manner that the total number of turns is reduced when rotating force from the driving source is large and the total number of turns is increased when the rotating force is small.

According to the present invention, as described above, the effective output winding wires whose number is three or its multiple number and which constitute the plurality of coreless winding wires are connected to the three-phase output terminal through the switching means so as to enable switching the total number of turns to a large or small value, and this switching means is changed over in accordance with an intensity of the rotating force from the driving source, thereby demonstrating the following effect.

When the total number of turns of the winding wires that produce electromotive force is set large even though external energy, e.g., wind power is excessively small (slight wind), an inductance can be increased. Therefore, a current produced in the coil increases to be output to the outside. Additionally, when the external energy excessively increases to become high wind or the like and the driving rotary shaft rotates at an extremely high speed, a frequency of the power to be generated can be prevented from abnormally rising by changing an inductance value of the power generating coil to a small value, thus enabling stable power generation.

BRIEF DESCRIPTION OF THE SEVERAL VIEWS OF THE DRAWINGS

FIG. 2 shows a configuration of a power generator in the system depicted in FIG. 1, wherein

FIG. 5 shows a first embodiment when an inductance of the stator coil is switched in the apparatus depicted in FIG. 2 in terms of intensity, wherein

FIG. 6 shows a second embodiment when the inductance of the stator coil is switched in the apparatus depicted in FIG. 2 in terms of intensity, wherein

DETAILED DESCRIPTION OF THE INVENTION

Figure 1:
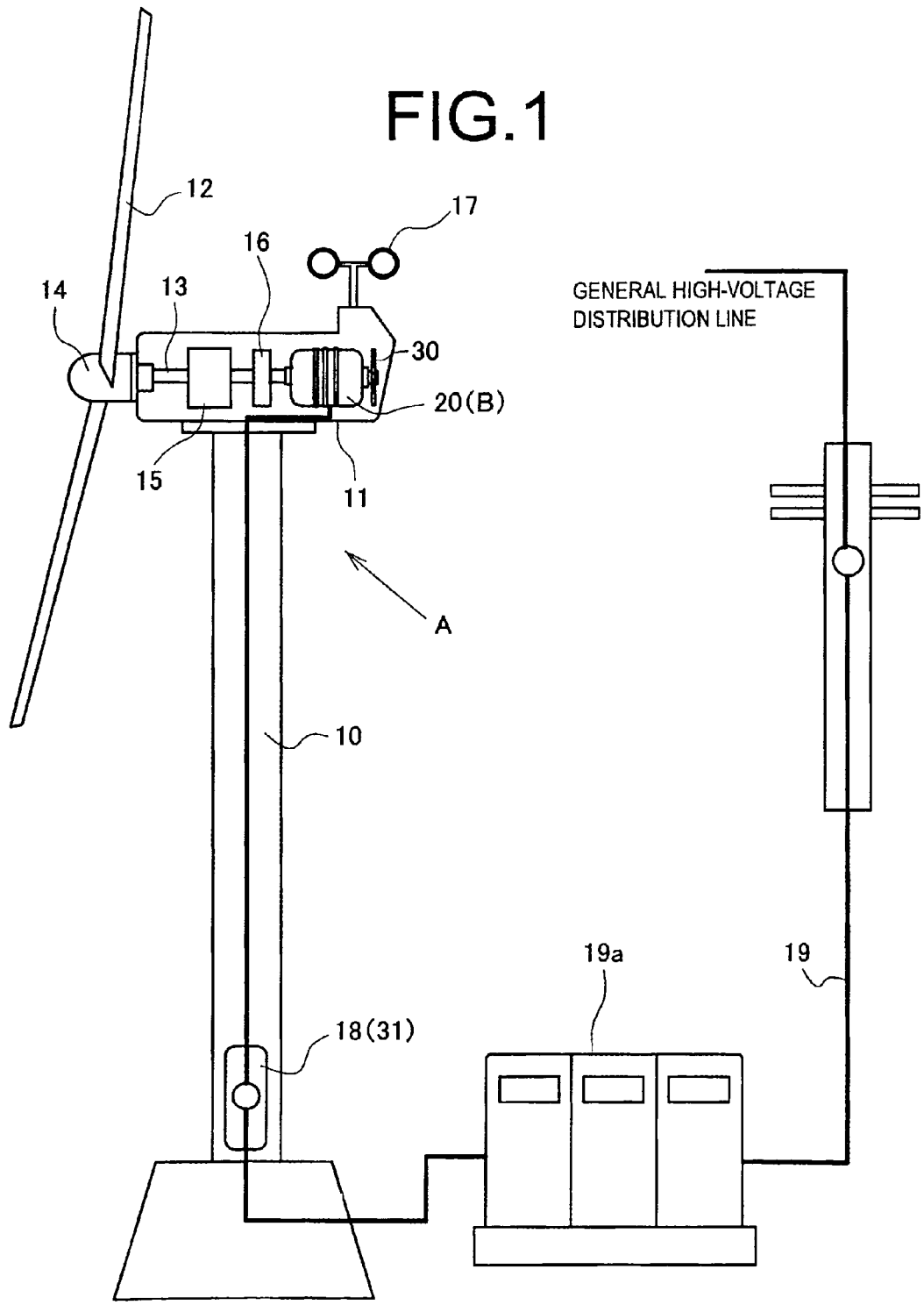
FIG. 1 is an explanatory view of an entire configuration of a power generation system according to the present invention.

The present invention will now be described hereinafter with reference to preferred embodiments of the present invention. As shown in FIG. 1 that depicts an outline of a power generation system according to the present invention, this system includes a [driving source A], a [power generation unit B], and a [power control unit C].
[Power Generation System]

As shown in FIG. 1 that depicts the outline of the power generation system according to the present invention, this system includes the [driving source A], the [power generation unit B], and the [power control unit C]. The driving source A converts energy from a power generation source such as wind power, water power, or vapor into rotational movement. The depicted system represents wind-power generation, and the driving source A includes a tower frame 10, a nacelle 11 mounted in this frame, and blades (wind-power blades) 12 rotatably disposed to this nacelle 11. Although depending on system installation conditions, the tower frame 10 is robustly configured so as to position the blades 12 at a location having a predetermine height from the ground. The nacelle 11 is disposed to this tower frame 10 to be rotatable in a wind power direction. This nacelle 11 includes a driving rotary shaft 13, a hub 14, a speed-up gear 15, and a power generator 20 (the later-described power generation unit B) therein.

The hub 14 is provided to the driving rotary shaft 13, and the blades 12 are fixed to this hub 14. The blade 12 is formed into a blade shape superior in efficiency for converting wind power into rotating force. Further, the driving rotary shaft 13 which rotates by the blades 12 is coupled with the power generator 20 through the speed-up gear 15 and a brake 16. Reference numeral 17 in the drawing denotes an anemometer, and the anemometer measures wind power at the time and notifies a control unit (which will be described later) of the wind power. Reference numeral 18 in the drawing designates a control panel, and reference numeral 19 in the drawing denotes a high-tension distribution line of an output unit C.

The blades 12 mounted on the tower frame 10 in this manner receive the wind power to rotate, and they transmit the rotating force to the driving rotary shaft 13. This driving rotary shaft 13 is coupled with the power generator 20 through the speed-up gear 15 and converts the wind power energy into electric energy. An electric current generated by the power generator 20 is supplied to the high-tension distribution line 19 from a transformer 19a through the control panel 18. This high-tension distribution line 19 is usually formed of a three-phase alternating current transmission line.
[Configuration of Control Panel]

In the thus configured power generation system, a regular commercial power transmission system requests the later-described power generator 20 to perform three-phase alternating current generation. Although a configuration of this power generator 20 will be described later, the control panel 18 is configured to serve the following two functions. The first function is to boost electric power generated by the power generator 20 to a predetermined voltage to be supplied to the high-tension distribution line 19 or to temporarily store the electric power in a storage battery (not shown). Furthermore, the second function is to detect the number of revolutions of the anemometer 17 provided to the tower frame 10 to judge whether the wind power falls within a full operation range. This controlling means (the control panel) 18 executes the following judgment to effect control by using, e.g., a control CPU or an electric circuit (a logic circuit). When it is determined that the number of revolutions of the anemometer 17 is equal to or above a preset allowable maximum value (Rmax), the brake (e.g., a mechanical braking mechanism) 16 is actuated to gradually reduce the number of revolutions of the blades 12. As a result, the blades 12 and the nacelle 11 can be prevented from being damaged.
[Power Generator]

Figure 2A:
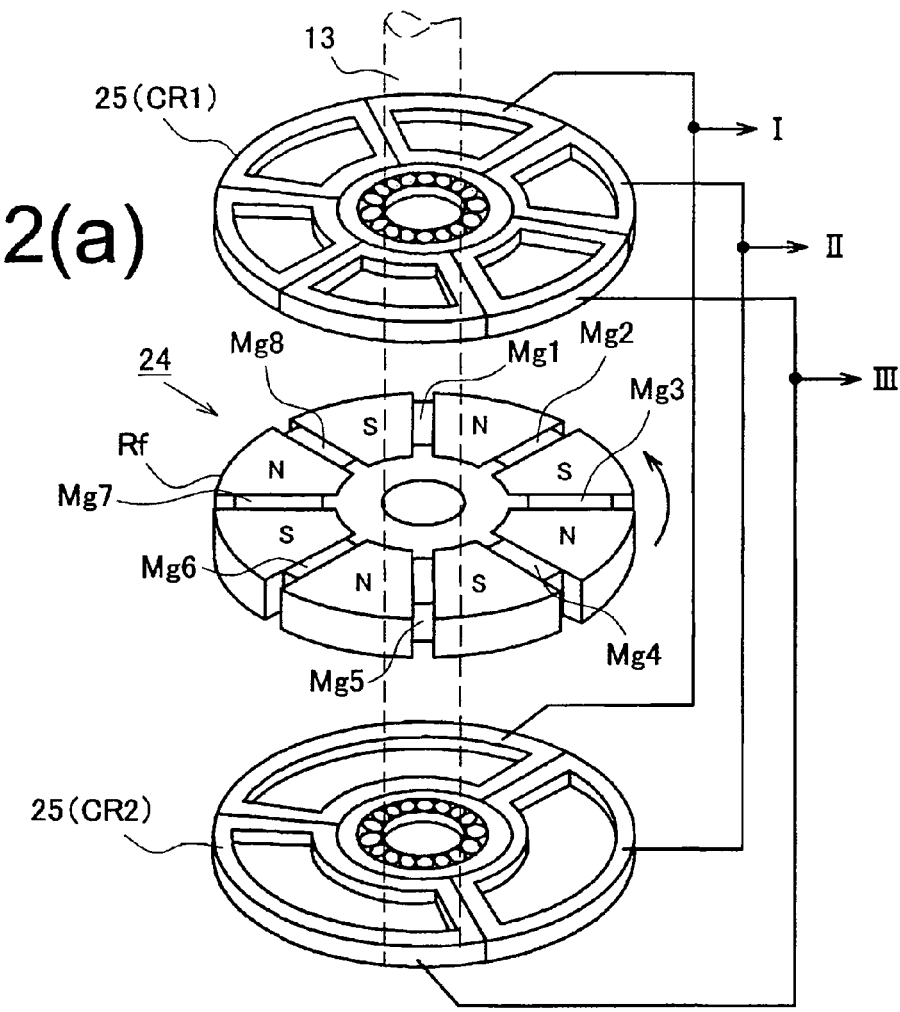
FIG. 2(a) is a perspective view showing configurations of a rotor and a stator and FIG. 2(b) is a cross-sectional view of an assembling state thereof.
Figure 2B:
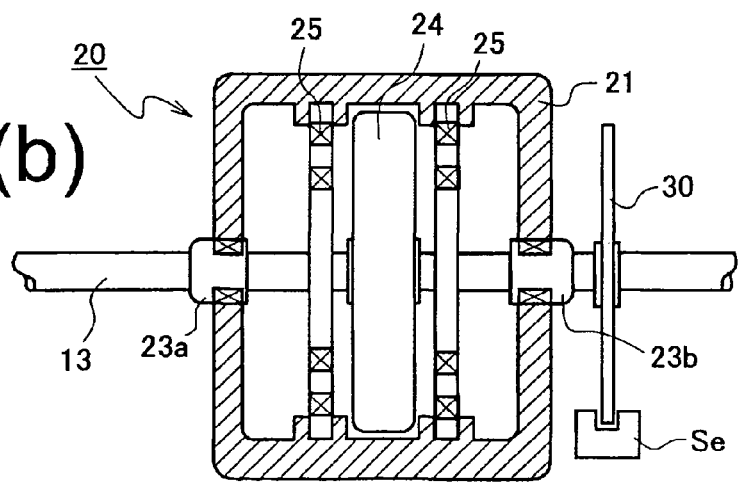

The driving rotary shaft (which will be referred to as a "rotary shaft" hereinafter) 13 includes the power generator 20 and an encoder 30 therein. The power generator 20 converts rotation of the rotary shaft 13 into electric energy, and the encoder 30 detects and controls the number of revolutions of the rotary shaft 13. As shown in FIG. 2(b), the power generator 20 axially supports the rotary shaft 13 by bearings 23a and 23b in a housing 21. A rotor frame Rf having a discoid shape is integrally disposed to this rotary shaft 13 as depicted in FIG. 2(a). This rotor frame Rf is obtained by integrally forming the metal rotary shaft 13 with a synthetic resin based on insert molding, for example. At the same time, magnets Mg and cores Rc are integrally embedded in the rotor frame Rf having the discoid shape.

Figure 3A:
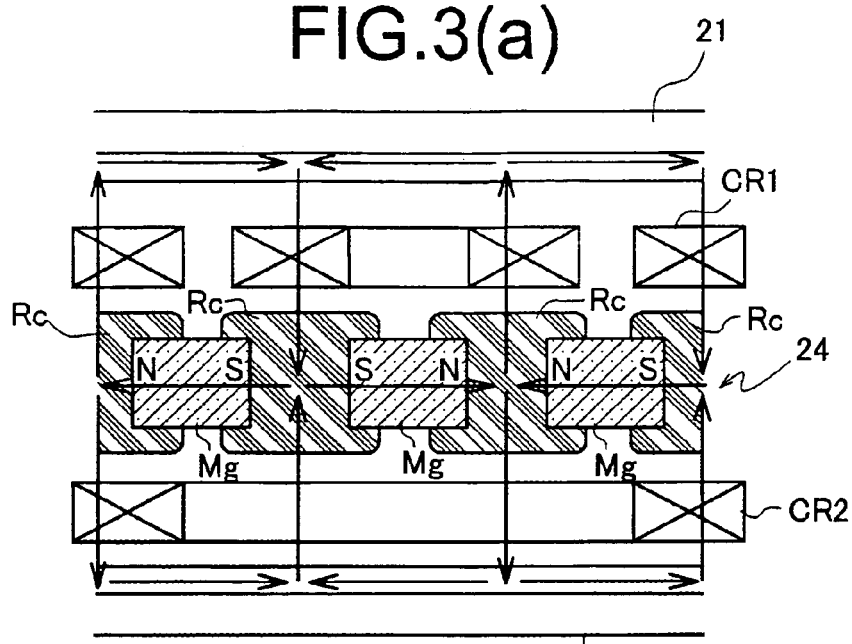
FIG. 3 is an explanatory view showing a cross-sectional configuration of a stator coil in the apparatus depicted in FIG. 2.

The drawing shows an example where eight magnetic poles Mn1 to Mn8 are formed in the magnet rotor 24. That is, N-S magnetic poles are formed at eight positions of the discoid rotary frame Rf at intervals of 45 degrees. As shown in FIG. 3 that depicts a cross section, the magnetic poles Mn1 to Mn8 are circularly arranged in a resin frame in such a manner that the same poles of the permanent magnets Mg (Mg1 to Mg8) are adjacent to each other as will be described later in conjunction with FIG. 6(b) (a pole configuration view). Furthermore, the magnetic poles adjacent to each other are magnetically coupled through the soft magnetic core members Rc and arranged to form an N pole or an S pole on front and back surfaces of the cores.

The soft magnetic core members Rc (Rc1 to Rc8 in the illustrated example) are aligned between the annularly arranged permanent magnets Mg (Mg1 to Mg8), and they are formed of a soft magnetic material such as iron. This soft magnetic core member Rc comes into contact with the permanent magnet Mg to be magnetically coupled with each other. As a result, a magnetic pole forming surface Mf (Mf1 to Mf8) is formed on each of a front surface and a back surface of the soft magnetic core member Rc, and each of the magnetic poles Mn1 to Mn8 is formed on this surface. This magnetic pole Mn is arranged at a position where it faces each of winding wires Co1 to Co6 of a later-described stator coil 25.

Figure 3B:
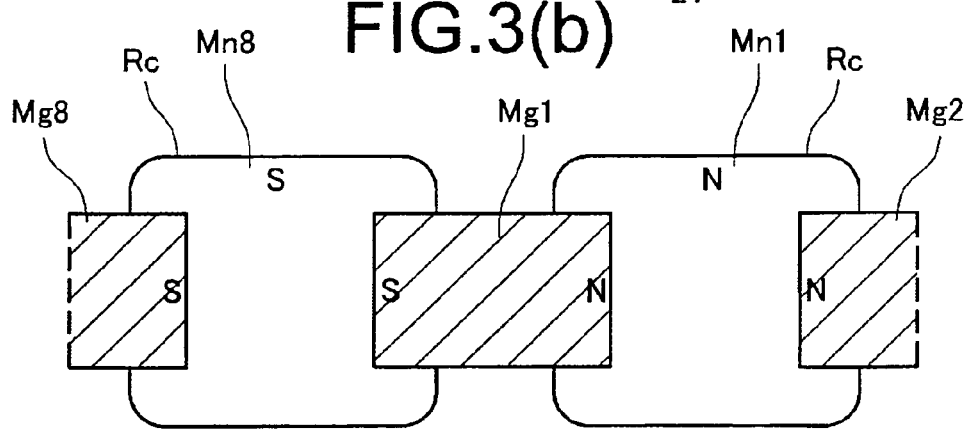
Figure 3C:
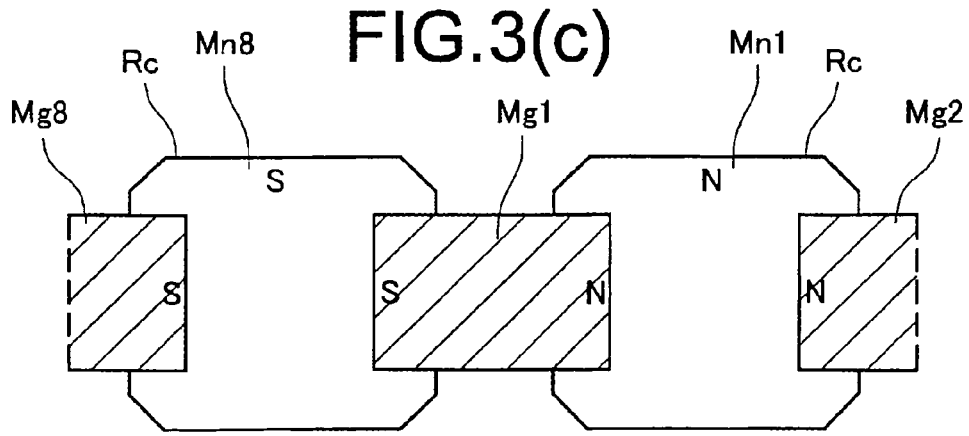

Moreover, the magnetic pole forming surface Mf of the respective soft magnetic core members Rc are aligned like N-S-N-S on the same concentric circle with the rotary shaft 13 at the center as shown in FIG. 2. At this time, when each corner portion of the magnetic forming surface Mf is sharp to form an acute angle, magnetism concentrates on this corner, and a leakage magnetic field is produced between the magnetic poles adjacent to each other. To avoid this magnetism concentration, each corner of the magnetic forming surface Mf of the soft magnetic core member Rc is cut. FIG. 3(b) shows an example where each corner is cut into a round shape, FIG. 3(c) shows an example where each corner is cut into an angular shape, and the corner is formed into a shape that prevents a magnetic field from leaking from the magnetic pole formed on the magnetic pole forming surface Mf to the magnetic pole of the adjacent magnetic pole forming surface in both the examples.

In this manner, the magnet rotor 24 is formed into a discoid shape with the rotor frame Rf, the permanent magnets Mg, and the cores Rc, and the magnetic poles Mn are formed on the front and back surfaces of this rotor at predetermined intervals (intervals of 45 degrees in the illustrated example). In the drawing, the magnet rotor 24 is configured with poles whose number is four or its multiple number in the relationship of the alternating current generation.

The stator coil 25 is included in the housing 21 to face the magnet rotor 24. As shown in FIG. 2, the stator coil 25 includes the winding wires Co1 to Co6 whose number is three or its multiple number (6 in the illustrated example) so as to face the magnetic poles Mn1 to Mn8 formed in the magneto rotor 24. This stator coil 25 is integrated by embedding the plurality of winding wires while being wound around coil frames Cf1 and Cf2 formed into a discoid shape by using a resin or the like.

Figure 4A:
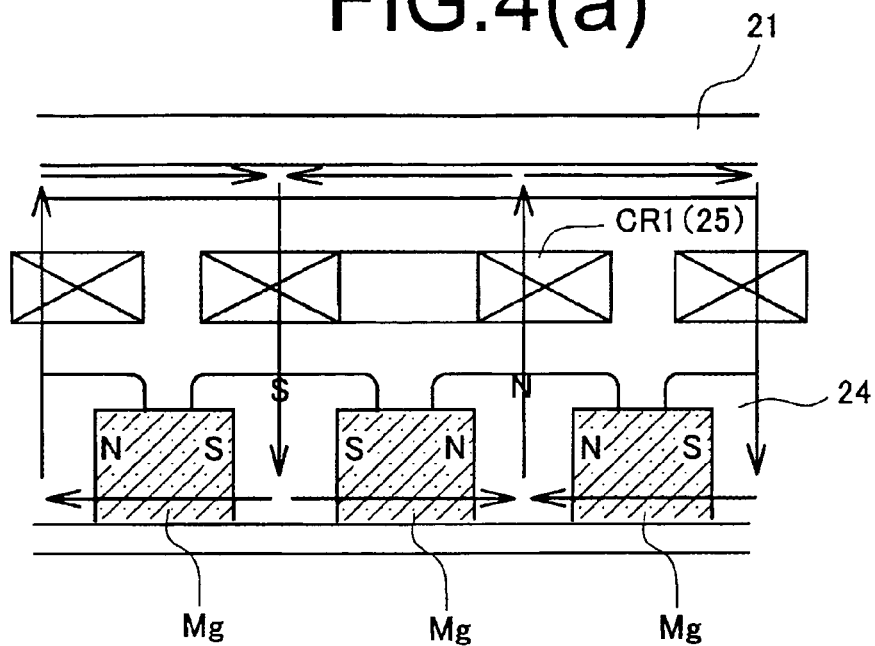
FIG. 4(a) shows an example where the stator coil is formed of one layer and FIG. 4(b) shows an example where the stator coil is formed of two layers in the apparatus depicted in FIG. 2.
Figure 4B:
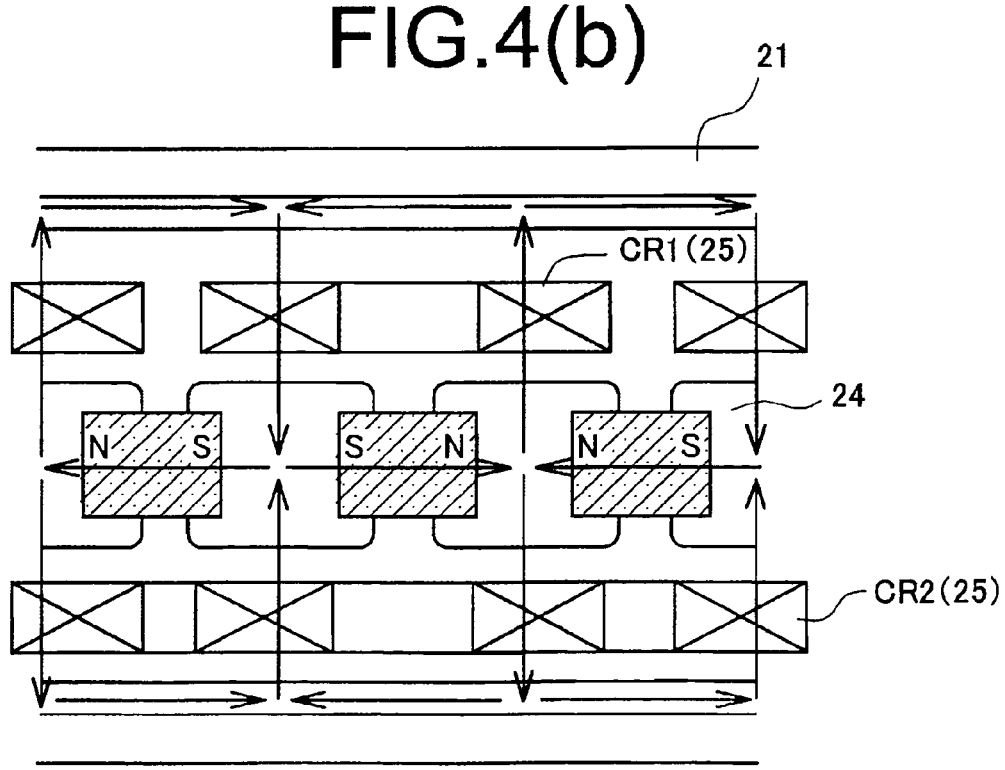

As shown in FIG. 4, this stator coil 25 can be constituted of a first coil body CR1 arranged at one position on the front surface side of the magnet rotor 24 (see FIG. 4(a)), and it can be constituted of the first coil body CR1 and a second coil body CR2 arranged at two positions on the front and back surfaces of the magnet rotor 24 (see FIG. 4(b)). The former coil one-layer configuration is characterized in that a small compact structure can be provided. Furthermore, the latter coil two-layer configuration is characterized in that a large output can be obtained.

As described above, the magnet rotor 24 and the stator coil 25 according to the present invention are configured in such a manner that the magnetic poles and the coil winding wires have a four-to-three relationship to output three-phase alternating current electricity. Thus, the present invention is characterized by changing and adjusting an inductance of the thus configured stator coil 25 to a large or small value. Therefore, the encoder 30 and a sensor Se that detect the number of revolutions are provided to the rotary shaft 13.

A configuration for changing an inductance of the stator coil 25 will now be described. A description will be given as to a first embodiment that the stator coil 25 includes the first coil body CR1 and the second coil body CR2 having the same configuration (the same inductance) and a second embodiment that the stator coil 25 includes the first coil body CR1 and the second coil body CR2 having different inductances.

First Embodiment

Figure 5A:
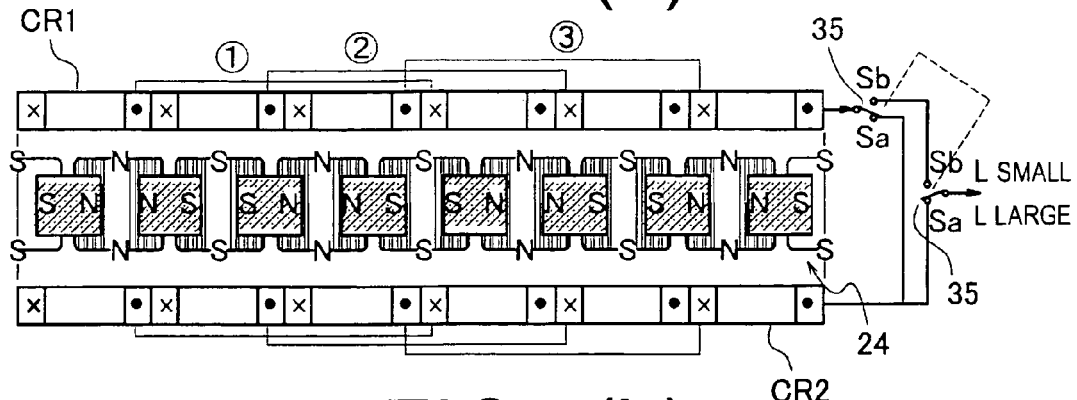
FIG. 5(a) is an explanatory view of a coil connection state and FIG. 5(b) is a perspective view of a coil configuration.
Figure 5B:
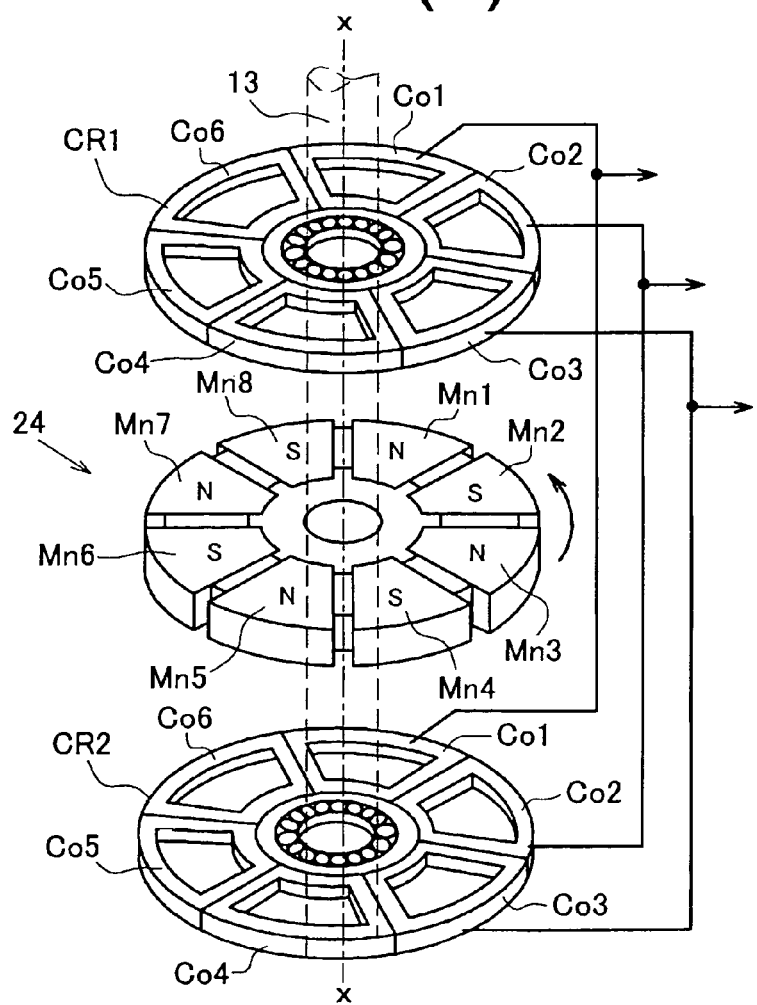

As shown in FIGS. 5(a) and (b), a magnet rotor 24 includes magnetic poles Mn1 to Mn8 having eight (a multiple number of 4) N and S poles annularly alternately arranged and a rotary shaft 13. A line x-x in the drawing denotes the center of rotation. Moreover, in a stator coil 25, a first coil body CR1 and a second coil body CR2 having the same configuration are arranged on a front surface side and a back surface side of the magnet rotor 24, respectively. Each of the first and second coil bodies CR includes six winding wires Co1 to Co6 as depicted in FIG. 5(b), and a pair of Co1 and Co4, a pair of Co2 and Co5, and a pair of Co3 and Co6 are electrically wire-connected, electromotive force having the same phase being produced in each pair. The first and second coil bodies CR1 and CR2 are wire-connected through switching means 35 as depicted in FIG. 5(a). Additionally, a large inductance is set when this switching means 35 is wire-connected in a direction indicated by Sa in the drawing, and a small inductance is set when the same is wire-connected in a direction indicated by Sb in the drawing.

Second Embodiment

Figure 6A:
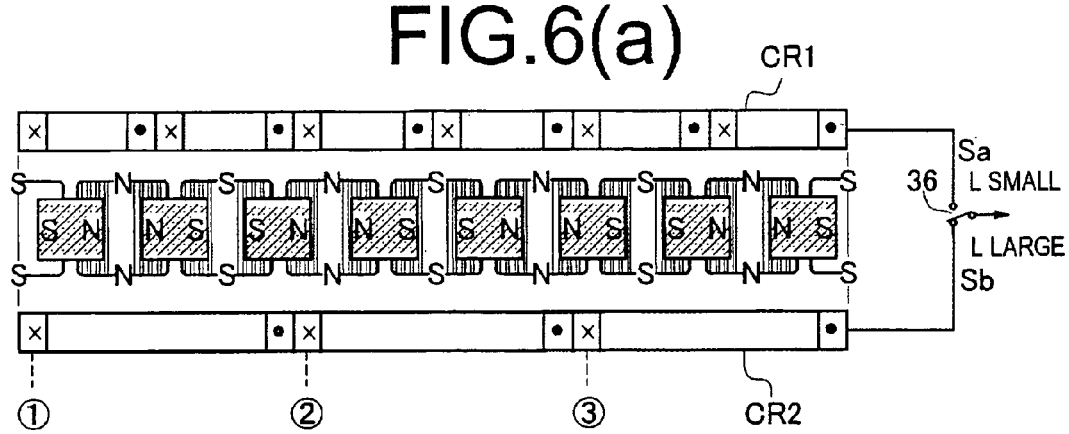
FIG. 6(a) is an explanatory view of a coil connection state and FIG. 6(b) is a perspective view of a coil configuration.
Figure 6B:
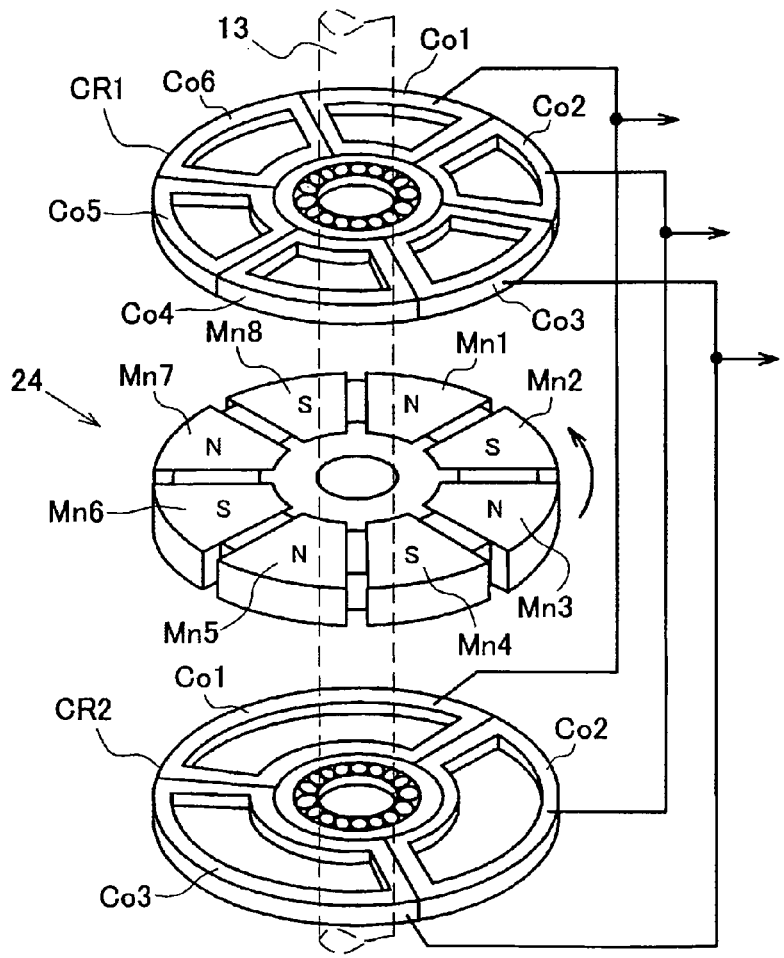

As shown in FIG. 6(a) and FIG. 6(b), a magnet rotor 24 includes magnetic poles Mn1 to Mn8 having eight (a multiple number of 4) N and S poles annularly alternately arranged and a rotary shaft 13 (the same configuration as the first embodiment). Further, in a stator coil 25, a first coil body CR1 and a second coil body CR2 are arranged on a front surface side and a back surface side of the magnet rotor 24, respectively. This first coil body CR1 includes Co1, Co2, Co3, Co4, Co5, and Co6, and a pair of Co1 and Co4, a pair of Co2 and Co5, and a pair of Co3 and Co6 are electrically wire-connected, electromotive force having the same phase being produced in each pair.

On the other hand, the second coil body CR2 includes three winding wires Co1 to Co3. Such first and second coil bodies CR1 and CR2 are wire-connected through switching means 36 as depicted in FIG. 6(a). Furthermore, when this switching means 36 is wire-connected in a direction indicated by Sa in the drawing, electric power produced in the first coil body CR1 is output, and a large inductance is set. Moreover, when the switching means 36 is wire-connected in a direction indicated by Sb in the drawing, electric power generated in the second coil body CR2 is output, and a small inductance is set.

[Configuration of Controlling Means]

In the thus configured stator coil 25, the small inductance and the large inductance are switched by the switching means 35 or 36 (which will be referred to as "first switching means ISW" hereinafter), and its control configuration will be described later. A control CPU 31 included in the nacelle 11 changes over the switching means 35 (36) to the Sa side to set the large inductance when the number of revolutions detected by the encoder 30 or the number of revolutions detected by the anemometer 17 is equal to or below the preset number of revolutions Rx. Likewise, it changes over the switching means 35 (36) to the Sb side to switch the large inductance to the small inductance when the number of revolutions is equal to or above the preset number of revolutions Rx.

A specific configuration of the first switching means ISW will now be described. This first switching means ISW (the switching means 35 or 36) changes over an inductance value of the coil used for power generation to be large or small by switching the winding wires Co1 to Co6 of the first coil body CR1, the winding wires Co1 to Co6 of the second coil body CR2, and an output line. Its switching configuration will now be described with reference to FIG. 7.

Figure 7A:
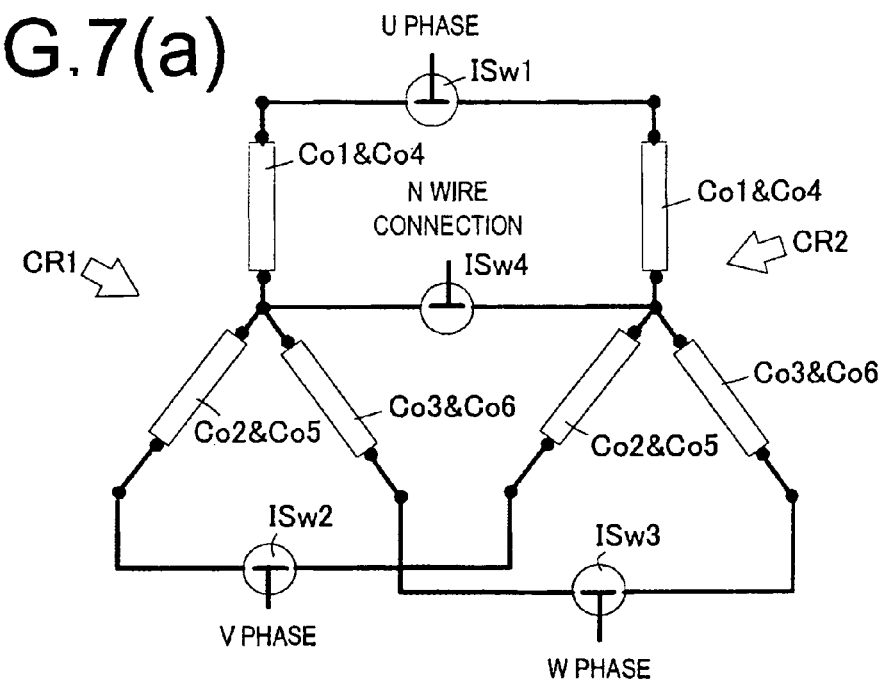
FIG. 7 is an explanatory view of a switching circuit that switches the inductance of the stator coil in the apparatus depicted in FIG. 2 in terms of intensity.

FIG. 7(a) shows an example where switching is performed when the coil used for power generation is the first coil body CR1 alone and when the coil is the first and second coil bodies CR1 and CR2. The first coil body CR1 arranged to face the front surface (the upper surface in FIG. 2) side of the magnet rotor 24 includes the winding wires Co1 to Co8 (a multiple number of 4), and a pair of the winding wires Co1 and Co4, and a pair of the winding wires Co2 and Co5, and a pair of the winding wires Co3 and Co6 are arranged in the same phase, respectively. Thus, a first phase (a U phase) of the winding wires Co1 and Co4, a second phase (a V phase) of the winding wires Co2 and Co5, and a third phase (a W phase) of the winding wires Co3 and Co6 are connected with a three-phase alternating current terminal, respectively.

Therefore, switching means ISW1 (a first phase output terminal portion), ISW2 (a second phase output terminal portion), and ISW3 (a third phase output terminal portion) are provided at wire connecting portions of the first coil body CR1 and the second coil body. Further, non-illustrated controlling means (e.g., the control CPU) changes over a situation where electric power is output to the three-phase output terminal from the first coil body CR1 alone and a situation where the same is output from both the first coil body CR1 and the second coil body CR2 by controlling ISW1, ISW2, and ISW3 to be simultaneously turned on or off. As a result, a small inductance is set in the former situation, and a large inductance is set in the latter situation. Thus, the controlling means uses the switching means ISW to set a large inductance value when a number of revolutions of the rotary shaft 13 becomes lower than a reference number of revolutions (an allowable minimum number of revolutions) stored in storing means having the number of revolutions of the rotary shaft 13 preset therein based on a signal from the sensor Se of the encoder 30, for example.

Figure 7B:
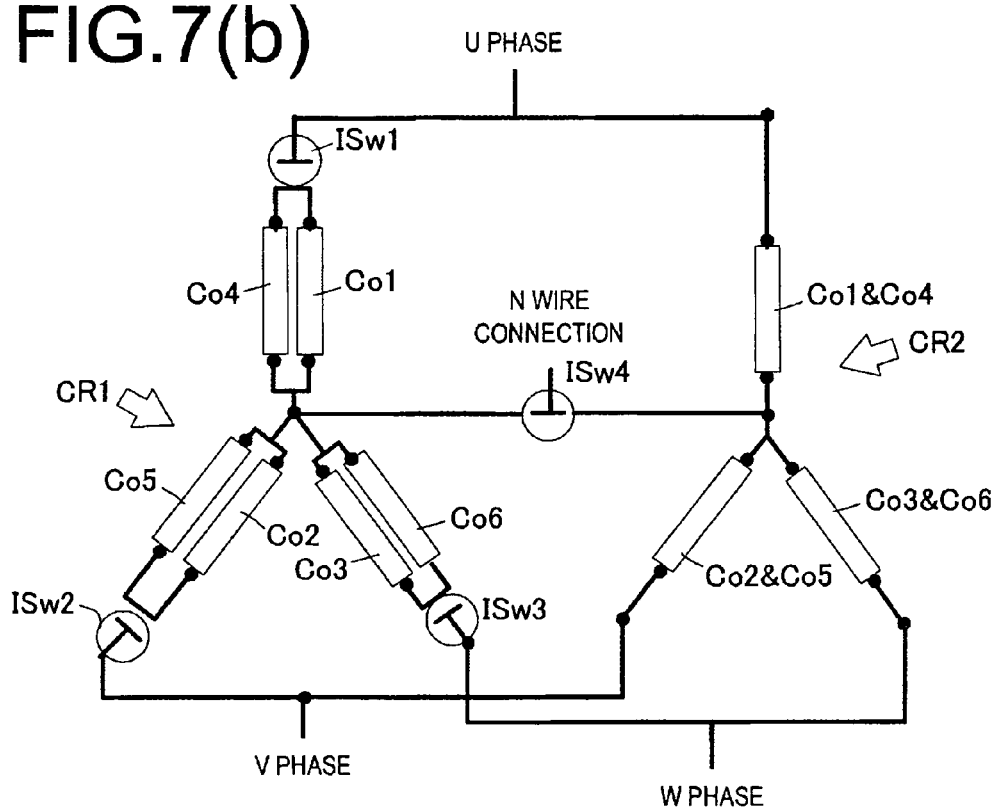

FIG. 7(b) shows an example where the switching means ISW1 to ISW3 change a total number of winding wires of the coils used for power generation by Switching a structure where the first coil body CR1 includes the three winding wires Co1, Co2, and Co3 and a structure where the same includes the six winding wires Co1 to Co6. An inductance value is changed over depending on a situation where one of the winding wires Co1 and Co4 placed in the same phase is connected to an output terminal of the first phase (the U phase) through the switching means ISW1 and a situation where both the winding wires Co1 and Co4 are connected to the same.

Likewise, the changeover is carried out depending on a situation where one of the winding wires Co2 and Co5 placed in the same phase is connected to an output terminal of the second phase (the V phase) through the switching means ISW2 and a situation where both the winding wires Co2 and Co5 are connected. Furthermore, the changeover is carried out depending on a situation where one of the winding wires Co3 and Co6 placed in the same phase is connected to an output terminal of the third phase (the W phase) through the switching means ISW3 and a situation where both these winding wires are connected. It is to be noted that each of FIGS. 7(a) and 7(b) shows an example of Y-Y wire connection, the inductance value can be likewise switched even if delta wire connection or V wire connection is adopted, and N wire connection in the drawing represents an intermediate line.

[Configuration of Electric Brake]

Figure 8:
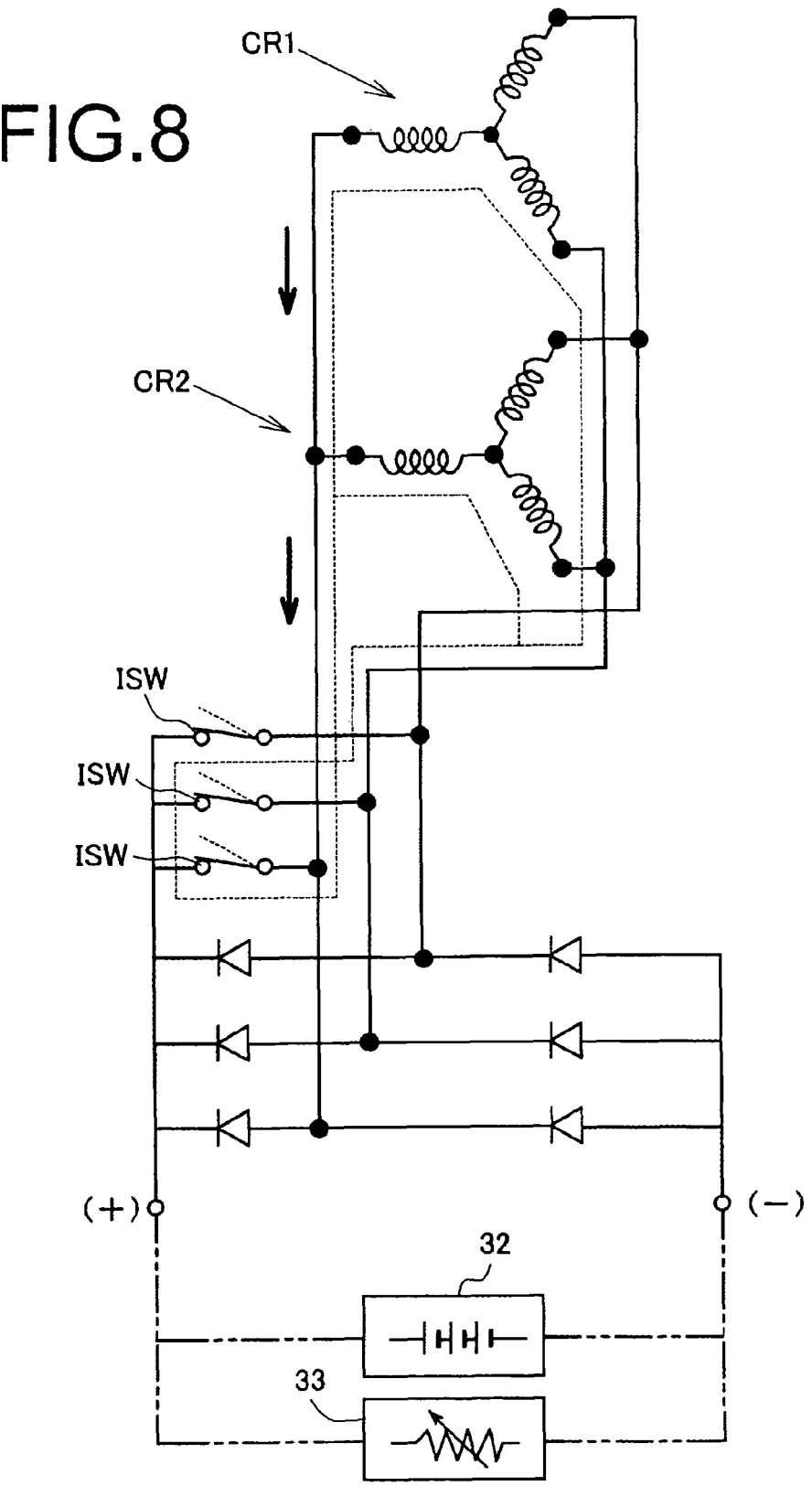
FIG. 8 is a circuit explanatory view of an electric brake at the time of excessive rotation of a rotary shaft in the apparatus depicted in FIG. 2.

An electric brake functions with respect to the stator coil 25 when the rotary shaft 13 rotates at an excessively high speed. Its configuration will now be described with reference to FIG. 8. The stator coil 25 is formed of the first coil body CR1 and the second coil body CR2 as depicted in FIG. 8, and the first switching means ISW changes over an inductance to be large or small. Each of the coil bodies CR1 and CR2 is connected with three-phase output terminals OP1, OP2, and OP3. Moreover, the output terminals OP are connected to a charger 32, and they are further connected to an external power transmission line from this charger 32. Reference numeral 33 in the drawing is a rectifier, and reference numeral 34 designates a load resistance. Second switching means BSW1, BSW2, and BSW3 are provided to the output terminals OP, electric power generated in the first coil body CR1 and the second coil body CR2 is transmitted to the external power transmission line from the terminals in a direction of solid line arrows in the drawing in an open state. Therefore, when the second switching means BSW are closed, a short circuit is formed, and the electric brake functions with respect to the rotary shaft 13 from the first and second coil bodies CR1 and CR2.

Therefore, the non-illustrated controlling means changes the second switching means BSW from the open state to the closed state when a number of revolutions obtained as a result of detecting a state that the rotary shaft 13 rotates at an excessively high speed from the sensor Se of the encoder 30 reaches a preset and stored allowable maximum number of revolutions. Then, the electric brake functions with respect to the rotary shaft 13. In this state, the controlling mans can be configured to switch in such a manner that the electric brake functions with respect to the first coil body CR1 (or the second coil body CR2) alone or in such a manner that the electric brake functions with respect to both the first coil body CR1 and the second coil body CR2.

Moreover, larger braking force can be obtained when the controlling means uses the second switching means SBW to apply the electric brake simultaneously with switching an inductance of the coil utilized for power generation from a small value to a large value by using the first switching means ISW when the rotary shaft 13 rotates at an excessively high speed.

What is claimed is:

1. A power generator comprising: a magnet rotor that rotates upon receiving rotating force from a driving source; and a stator coil arranged to face magnetic poles of the magnet rotor,
   wherein the magnet rotor includes:
   a rotary shaft rotatably and axially supported by a housing; and
   a permanent magnet that forms a plurality of magnetic poles on a concentric circle with the rotary shaft at a center,
   the stator coil includes:
   a plurality of coreless winding wires arranged to face the magnetic poles formed in the magnet rotor; and
   a three-phase output terminal that outputs electric power generated in the plurality of winding wires to outside,
   the plurality of coreless winding wires are formed from three or multiple of three effective output winding wires and connected with the three-phase output terminal through a switching device to enable switching a total number of turns to a large or small value,
   the switching device is connected to a controlling device in which the total number of turns is reduced when the rotating force from the driving source is large and the total number of turns is increased when the rotating force is small,
   the magnet rotor has a discoid shape including the rotary shaft at the center and is configured to form magnetic fields in both front and back surface directions,
   the plurality of coreless winding wires form a pair of coil bodies on front and back sides that are arranged to face each other to sandwich the magnetic poles in the discoid shape from the front and back surface directions,
   the coil bodies on the front and back sides that are formed of the plurality of winding wires are configured to have substantially same inductance values, and
   the switching device changes the inductance value to a small value or a large value by connecting the winding wires of one of the coil bodies on the front and back sides to the three-phase output terminal or connecting the winding wires of both the coil bodies on the front and back sides to the same.

2. The power generator according to claim 1, wherein the magnet rotor includes the rotary shaft and a plurality of N-S magnetic poles annularly arranged with the rotary shaft at the center,
   the stator coil includes the plurality of coreless winding wires annularly arranged to face the magnetic poles,
   the N-S magnetic poles of the magnet rotor are formed on a plurality of permanent magnets arranged in such a manner that same magnetic poles are adjacent to each other with the rotary shaft at the center and magnetic pole forming surfaces of soft magnetic core members arranged to be magnetically coupled with each other between the permanent magnets, and
   corner portions of the plurality of annularly arranged magnetic pole forming surfaces are cut so as to prevent magnetism from concentrating on the corner portions that are adjacent to each other.

3. A power generation system comprising:
   a driving rotary shaft that rotates based on external force including wind power and water power;
   a magnet rotor coupled with the driving rotary shaft; and
   a stator coil arranged to face magnetic poles of the magnet rotor,
   wherein each of the magnet rotor and the stator coil has a configuration according to claim 1.

4. A power generator comprising: a magnet rotor that rotates upon receiving rotating force from a driving source; and a stator coil arranged to face magnetic poles of the magnet rotor,
   wherein the magnet rotor includes:
   a rotary shaft rotatably and axially supported by a housing; and
   a permanent magnet that forms a plurality of magnetic poles on a concentric circle with the rotary shaft at a center,
   the stator coil includes:
   a plurality of coreless winding wires arranged to face the magnetic poles formed in the magnet rotor; and
   a three-phase output terminal that outputs electric power generated in the plurality of winding wires to outside,
   the plurality of coreless winding wires are formed from three or multiple of three effective output winding wires and connected with the three-phase output terminal through a switching device to enable switching a total number of turns to a large or small value,
   the switching device is connected to a controlling device in which the total number of turns is reduced when the rotating force from the driving source is large and the total number of turns is increased when the rotating force is small,
   the magnet rotor has a discoid shape including the rotary shaft at the center and is configured to form magnetic fields in both front and back surface directions,
   the coreless winding wires form a pair of coil bodies on front and back sides that are arranged to face each other to sandwich the magnetic poles in the discoid shape from the front and back surface directions,
   the coil bodies on the front and back sides that are formed of the plurality of winding wires are configured to have substantially different inductance values, and
   the switching device changes the inductance value to a small value or a large value by connecting one of the coil bodies on the front and back sides to the three-phase output terminal.

5. The power generator according to claim 4, wherein the magnet rotor includes the rotary shaft and a plurality of N-S magnetic poles annularly arranged with the rotary shaft at the center,
   the stator coil includes the plurality of coreless winding wires annularly arranged to face the magnetic poles,
   the N-S magnetic poles of the magnet rotor are formed on a plurality of permanent magnets arranged in such a manner that same magnetic poles are adjacent to each other with the rotary shaft at the center and magnetic pole forming surfaces of soft magnetic core members arranged to be magnetically coupled with each other between the permanent magnets, and
   corner portions of the plurality of annularly arranged magnetic pole forming surfaces are cut so as to prevent magnetism from concentrating on the corner portions that are adjacent to each other.

6. A power generator comprising: a magnet rotor that rotates upon receiving rotating force from a driving source; and a stator coil arranged to face magnetic poles of the magnet rotor,
   wherein the magnet rotor includes:
   a rotary shaft rotatably and axially supported by a housing; and a permanent magnet that forms a plurality of magnetic poles on a concentric circle with the rotary shaft at a center, the stator coil includes:

a plurality of coreless winding wires arranged to face the magnetic poles formed in the magnet rotor; and a three-phase output terminal that outputs electric power generated in the plurality of winding wires to outside, the plurality of coreless winding wires are formed from three or multiple of three effective output winding wires and connected with the three-phase output terminal through a switching device to enable switching a total number of turns to a large or small value, the switching device is connected to a controlling device in which the total number of turns is reduced when the rotating force from the driving source is large and the total number of turns is increased when the rotating force is small, the magnet rotor has a discoid shape including the rotary shaft at the center and is configured to form magnetic fields in front and back surface directions, the plurality of coreless winding wires form a pair of coil bodies on front and back sides that are arranged to face each other to sandwich the magnetic poles in the discoid shape from the front and back surface directions, the coil bodies on the front and back sides are connected with the three-phase output terminal and the controlling device for short-circuiting an output from each coil body is connected to the three-phase output terminal, and the controlling device applies electric brake to the magnet rotor from the front and back surfaces at the time of overload rotation of the driving rotary shaft.

7. The power generator according to claim 6, wherein the magnet rotor includes the rotary shaft and a plurality of N-S magnetic poles annularly arranged with the rotary shaft at the center, the stator coil includes the plurality of coreless winding wires annularly arranged to face the magnetic poles, the N-S magnetic poles of the magnet rotor are formed on a plurality of permanent magnets arranged in such a manner that same magnetic poles are adjacent to each other with the rotary shaft at the center and magnetic pole forming surfaces of soft magnetic core members arranged to be magnetically coupled with each other between the permanent magnets, and corner portions of the plurality of annularly arranged magnetic pole forming surfaces are cut so as to prevent magnetism from concentrating on the corner portions that are adjacent to each other.

* * * * *